United States Patent [19]

Lyon

[11] 4,021,354
[45] May 3, 1977

[54] PRESSURE FILTER

[75] Inventor: Robert Lyon, Manlius, N.Y.

[73] Assignee: Bristol-Myers Company, New York, N.Y.

[22] Filed: Oct. 31, 1975

[21] Appl. No.: 627,587

[52] U.S. Cl. .............................. 210/477; 210/489; 210/498; 210/510

[51] Int. Cl.² ........................................ B01D 23/02

[58] Field of Search .......... 210/473, 441, 445, 446, 210/450, 451, 452, 471, 474, 477, 164, 184, 131, 314, 489, 498, 510, 323 R, 323 T

[56] References Cited

UNITED STATES PATENTS

| 626,991 | 6/1899 | Eberhard | 210/452 X |
|---|---|---|---|
| 1,312,041 | 8/1919 | Morison | 210/452 |
| 1,652,173 | 12/1927 | Lalor | 210/452 X |
| 2,174,265 | 9/1939 | Holt | 210/184 X |
| 2,562,735 | 7/1951 | Pick | 210/131 |
| 2,584,206 | 2/1952 | Hodsdon | 210/164 |
| 2,600,150 | 6/1952 | Abendroth | 210/314 X |
| 2,603,356 | 7/1952 | Hisey | 210/169 |
| 2,872,044 | 2/1959 | Kasten | 210/323 T |
| 2,946,446 | 7/1960 | Howard | 210/323 T |
| 2,995,253 | 8/1961 | Belgarde et al. | 210/323 R |
| 3,045,826 | 7/1962 | Howard et al. | 210/443 X |
| 3,295,685 | 1/1967 | Young | 210/323 T |
| 3,394,815 | 7/1968 | Harms et al. | 210/323 T |
| 3,448,859 | 6/1969 | Hall et al. | 210/452 X |
| 3,542,204 | 11/1970 | Clark | 210/450 X |
| 3,560,377 | 2/1971 | Loeffler | 210/450 X |
| 3,640,392 | 2/1972 | Smith et al. | 210/452 X |
| 3,700,110 | 10/1972 | Engalitcheff, Jr. | 210/450 X |
| 3,828,527 | 8/1974 | Briggs et al. | 210/450 X |

FOREIGN PATENTS OR APPLICATIONS

| 740 | 2/1878 | United Kingdom | 210/473 |
|---|---|---|---|
| 18,392 | 10/1893 | United Kingdom | 210/477 |

Primary Examiner—Frank W. Lutter
Assistant Examiner—Richard L. Chiesa
Attorney, Agent, or Firm—Jones, Tullar & Cooper

[57] ABSTRACT

A filter for use with sterile slurries or the like comprises a filter basket and means for suspending the filter basket inside a housing, the suspending means for the basket including a sealing O-ring. The O-ring is disposed so that it never comes into contact with the slurry and serves to seal off the space above the basket from the space below the basket so that positive pressure or a vacuum may be used to assist the filtration process. The bottom of the filter basket forms a filter plate and means are provided for supporting the bottom surface of the filter plate. This supporting means includes a distribution plate which is attached to the basket and which has a plurality of inverted T shaped ribs attached to its lower surface.

3 Claims, 4 Drawing Figures

PRESSURE FILTER

FIELD OF THE INVENTION

The present invention relates, in general, to an improved filter designed for the filtration of sterile slurries wherein either positive pressure or a vacuum may be used to aid the filtration process.

DESCRIPTION OF THE PRIOR ART

The prior art is replete with filtering devices which have many different kinds of filtering media and which may or may not utilize positive pressure or vacuum in the filtration process. For example, U.S. Pat. No. 1,312,041 to Morison discloses perforated filter baskets suspended in a housing and covered on their outside surfaces with a filtering material in the form of a flexible bag. However, the filter baskets of Morison are not adapted to utilize pressure or vacuum and are not suitable for use with sterile slurries.

U.S. Pat. No. 2,174,265 to Holt and U.S. Pat. No. 2,603,356 to Hisey both disclose filtering devices in which the filtering media is a flexible planar piece of filter paper which is peripherally secured on a rim-like structure. However, such a flexible type of filter paper requires the use of complex means to secure its peripheral edge and to support its bottom surface, and such elaborate securing and supporting means are disadvantageous. Likewise, U.S. Pat. No. 2,584,206 discloses planar filtering elements which are peripherally supported in a housing made of a rubber-like material. Such a filter is not suitable for use with sterile slurries as particles from the rubber-like material, arising perhaps from the degradation of the material, will contaminate the slurry.

A patent to Smith et al, U.S. Pat. No. 3,640,392, discloses a pressure filter in which the filtering media comprises a suspended flexible bag. However, the bag is not firmly supported along its bottom surface and cannot hold a very large weight of the slurry to be filtered without deforming. Likewise, the lower portion of the filter bag in U.S. Pat. No. 2,562,735 to Pick is unsupported.

Thus, the prior art filters are confronted with a number of problems among which are the need to make the filter housing air tight so as to be able to utilize positive pressure or vacuum to assist the filtration process, the need to support the filtering media in an adequate but preferably simple way and, especially when filtering sterile slurries, the need to prevent contamination of the slurry by the filter components.

SUMMARY OF THE INVENTION

It is an object of the present invention to solve the problems of the prior art filters and to provide an improved pressure filter for use with sterile slurries.

It is a further object of the present invention to provide a pressure filter having an improved means for supporting the bottom surface of the filtering media and which supporting means can be easily removed to allow access to the filtering media while not being structurally complex.

It is an additional object of the present invention to provide a pressure filter which is especially adapted to filter sterile slurries in that contact of the slurry with materials in the filter components likely to degrade and serve as a source of contaminant is minimized.

These and other objects of the present invention are accomplished by a pressure filter comprising a filter basket and a means for suspending the filter basket inside a housing which is capable of being hermetically sealed. The suspending means includes a sealing means in the form of an O-ring which seals off the space inside the housing that is above the filter basket from the space inside the housing that is below the filter basket. Thus, positive pressure above the basket or a vacuum below the basket may be utilized to aid the filtration process. The housing has an inlet conduit for the slurry to be filtered and an outlet conduit for the filtrate.

The O-ring in the suspending means is disposed outside of the filter basket in such a manner that it is always above the level of the sterile slurry in the filter basket. This arrangement ensures that the slurry will never contact the O-ring and thus cannot become contaminated by small particles of the O-ring. In addition, all the surfaces of the filter basket and the housing which do come in contact with the slurry are specially prepared and polished to present the smoothest possible surface in order to minimize the possibility of slurry contamination.

The filter basket comprises a tapered stainless steel cylindrical shell having a bottom made of a disk of a suitable filtering media such as a sintered stainless steel plate. Means are provided for supporting the filter plate so that the filter plate does not deform under the weight of the slurry and the filter cake deposited thereon. This supporting means includes a perforated distribution plate which supports the bottom of the filter plate and which may be removably attached to the basket. The distribution plate has a plurality of reinforcing ribs attached to its bottom surface, the ribs as applied to the distribution plate having an inverted T-shape. Because the distribution plate may be easily detached from the basket and the filter plate, access to the filter plate for cleaning or other purposes is thereby facilitated.

BRIEF DESCRIPTION OF THE DRAWINGS

The novel features of the present invention are set out with particularity in the appended claims, but the invention will be understood more fully and clearly from the following detailed description of a preferred embodiment of the invention as set forth in the accompanying drawings, in which:

DESCRIPTION OF A PREFERRED EMBODIMENT

Figure 1:
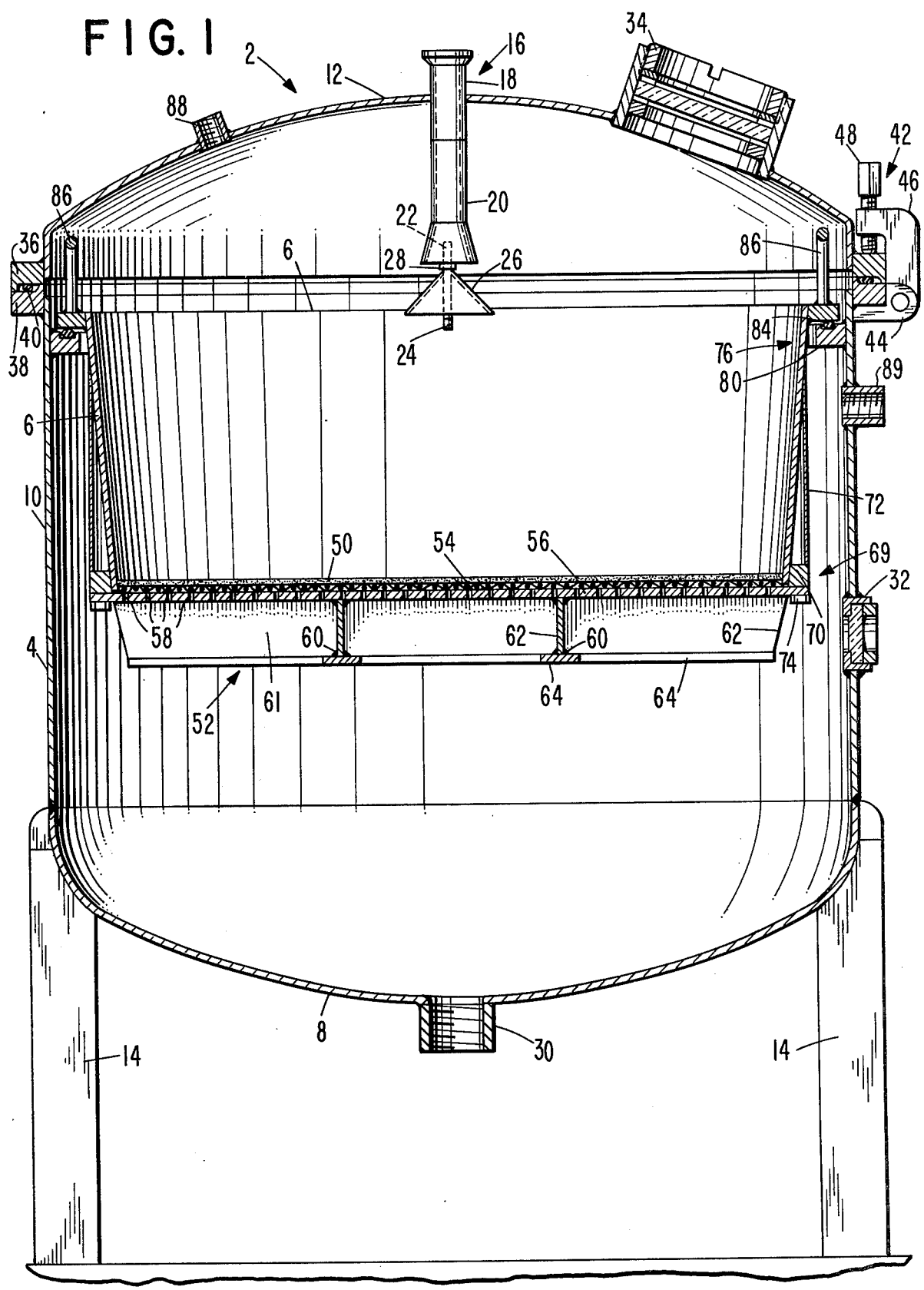
FIG. 1 is a sectional view through the pressure filter of the present invention along line 1—1 of FIG. 2 and showing the inlet conduit and deflecting shield in a full elevational view.

The pressure filter of the present invention, generally indicated at 2 in FIG. 1, comprises an outer housing, or casing, 4 having a filter basket 6 supported therein. The outer housing 4 includes a dish-shaped bottom portion 8 which flares into and is formed with a central portion 10 comprising an upwardly extending cylindrical section. A domed lid 12 is pivotally connected (not shown) to the cylindrical section 10 and is adapted to be closed over the cylindrical section 10 in a mating relationship to form the closed outer housing 4. The outer housing 4 is supported by a plurality of legs 14 which may be suitably attached at their upper ends to the bottom portion 8 of the housing 4 as by welding.

Figure 2:
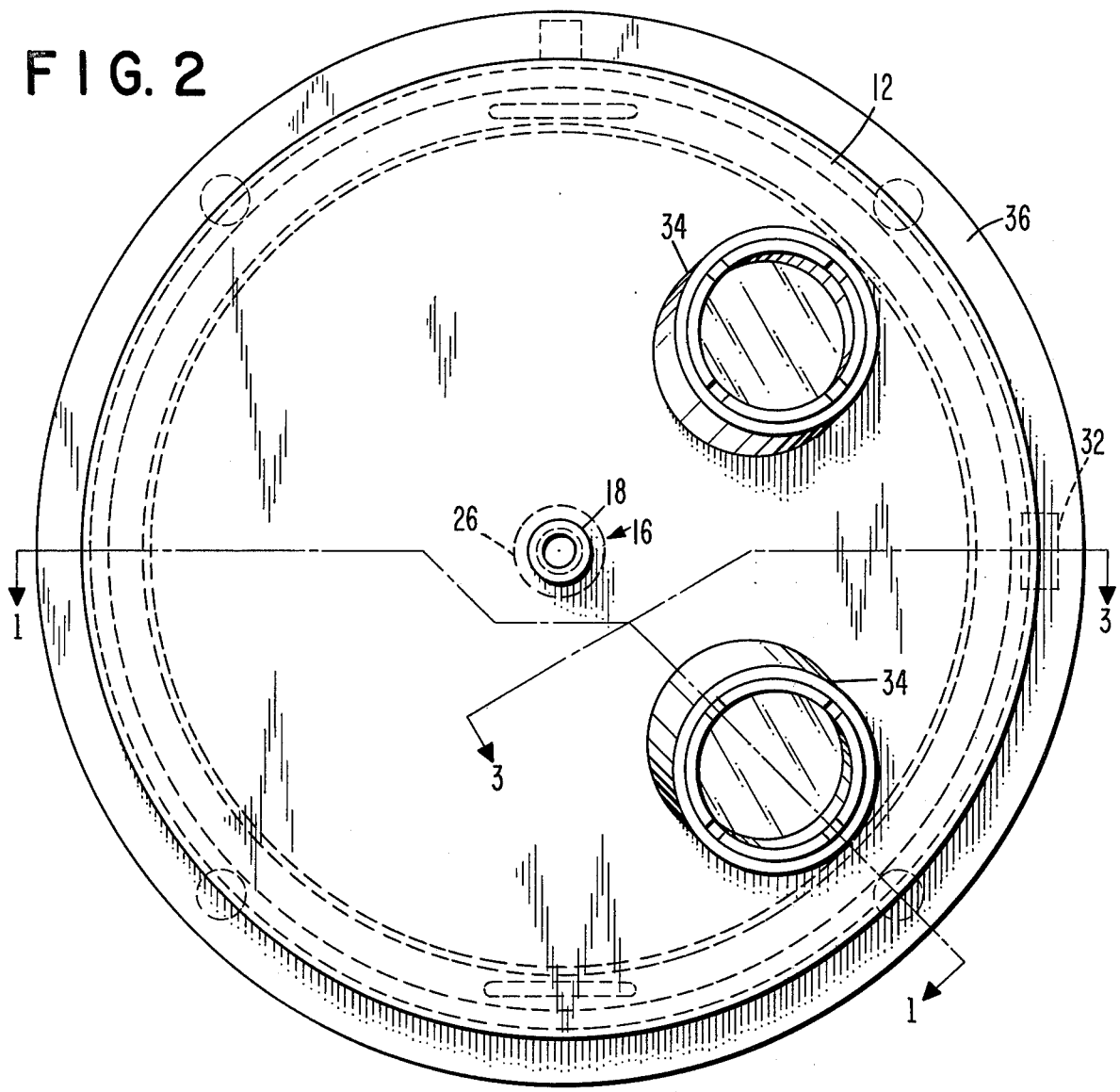
FIG. 2 is a top plan view of the pressure filter of the present invention.
Figure 3:
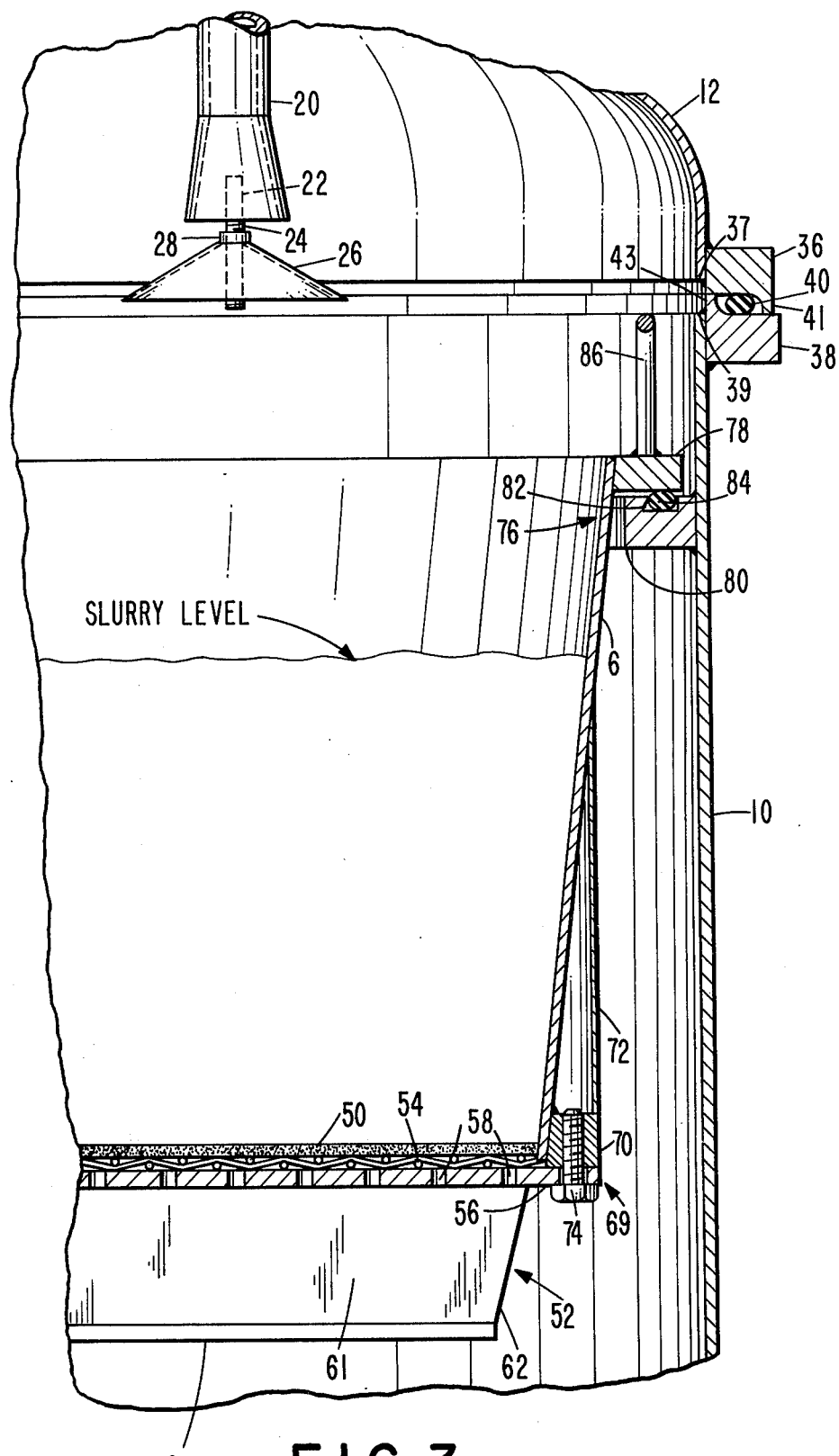
FIG. 3 is a partial sectional view through the pressure filter of the present invention along line 3—3 of FIG. 2 and showing the inlet conduit and deflecting shield in a full elevational view.

Referring now to FIGS. 1-3, an inlet conduit 16 for the slurry to be filtered is located at the center point of the domed lid 12. This conduit is comprised of a hollow elongated tube which has an upper portion 18 extending above the domed lid 12 and a lower portion 20 extending below the lid 12. The lower portion 20 of the tube is not perfectly hollow but has inside it a spider or similar supporting framework having a central hub (not shown) which is provided with a threaded bore 22. Of course, this spider or supporting framework is so formed relative to the tube so as not to appreciably hamper the flow of the slurry through the tube and thus does not obstruct the cross sectional flow area of the tube. A bolt 24 is threadedly secured at one end in the bore 22 and the free end of the bolt 24 depends downwardly past the edge of the lower portion 20 of the tube. A slurry deflecting shield 26 in the shape of a cone has a nut 28 fixedly secured to the apex of the cone (see FIG. 3). By virtue of the nut 28, the deflecting shield 26 may be adjustably screwed onto the free end of the bolt 24 until the shield is at a desired position spaced from the edge of the lower portion 20 of the tube. The purpose of the shield 26 is to contact and evenly distribute into the filter basket 6 the incoming slurry being discharged by the tube. Of course, it is understood that the shield 26 may be fixed at a desired position spaced from the edge of the lower portion 20 of the tube by means of rigid arms (not shown) connecting the shield to the outside surface of the lower portion of the tube.

An outlet conduit 30 is located at the lowest point of the bottom portion 8 of the housing and depends downwardly therefrom, the conduit 30 serving as the outlet means for the filtrate. A sight glass 32 for viewing the inside of the casing 4 is located in the central portion 10 of the housing 4 and two other sight glasses 34 may be located in the lid 12, all of the sight glasses being sealed in an air-tight relationship with the housing.

As previously stated, the lid 12 is pivotally connected to the central portion 10 of the casing 4, this pivotal connection not being shown as it is understood that any conventional pivoting arrangement may be used. However, it is important that when the lid 12 is in its closed position that the housing 4 be hermetically sealed. Therefore, means for hermetically sealing the housing are provided and comprise a flange 36 which is secured to the outside surface of the lid 12 adjacent its edge 37, the flange 36 completely encircling the lid 12 and extending outwardly therefrom. A mating flange 38 likewise is provided on the outside surface of the central portion 10 of the casing and encircles the central portion 10 adjacent the upper edge 39 of the central portion 10. The outer portion of the flange 36 has a downwardly extending lip 41 which contacts the upper surface of the flange 38 and the inner portion of the flange 38 has an upwardly extending lip 43 which contacts the underside of the flange 36 when the lid is in its closed position so that the flanges 36 and 38 are spaced apart a small distance.

An O-ring 40 is interposed between the flanges 36 and 38 along their entire lengths; when the flanges are pressed together, the O-ring deforms until the lips 41 and 43 contact the flange opposite thereof and a hermetic seal is achieved. The lips 41 and 43 by regulating the distance between the flanges 36 and 38 prevent crushing of the O-ring 40 and extend the useful life thereof. The flanges 36 and 38 are pressed together by a plurality of C-clamps spaced around the periphery of the housing. One of the C-clamps is generally indicated in FIG. 1 at 42 as being made up of a lower portion 44 fixed to the outside surface of the central portion 10 of the casing 4 adjacent the edge 39 of the central portion 10, and an upper portion 46 which is pivotally connected to the lower portion 44. The upper portion 46 of the C-clamp threadedly carries a flat-headed screw 48 which is adapted to be tightened and to bear against the upper surface of the flange 36 on the lid 12 to press the flanges 36 and 38 together.

Turning now to the filter basket 6, the basket is made of a suitable metallic material, such as stainless steel, and comprises a tubular shell which tapers inwardly in the direction towards the bottom of the housing 4, i.e. the widest part of the basket 6 is at the top of the basket near the inlet conduit 20, as can be seen in FIGS. 1 and 3. A filtering media 50, which is a sintered stainless steel plate in the shape of disk that is welded to the lower end of the basket 6, forms the bottom of the basket 6.

In order that the filter plate 50 may be able to support the weight of the solid materials which build up on the plate in the form of a filter cake during a filtering operation, means are provided for supporting the bottom of the filter plate 50, the supporting means being indicated generally at 52. The supporting means 52 comprise a stainless steel supporting screen 54 which is placed underneath the plate 50 immediately adjacent thereto and in contact with the lower surface of the plate 50. A circular distribution plate 56 is then placed beneath the screen 54 in contact therewith to support both the screen and the filter plate 50. The distribution plate 56 is suitably perforated, as indicated by the holes 58, to allow the filtrate to pass through into the bottom 8 of the casing 4.

Figure 4:
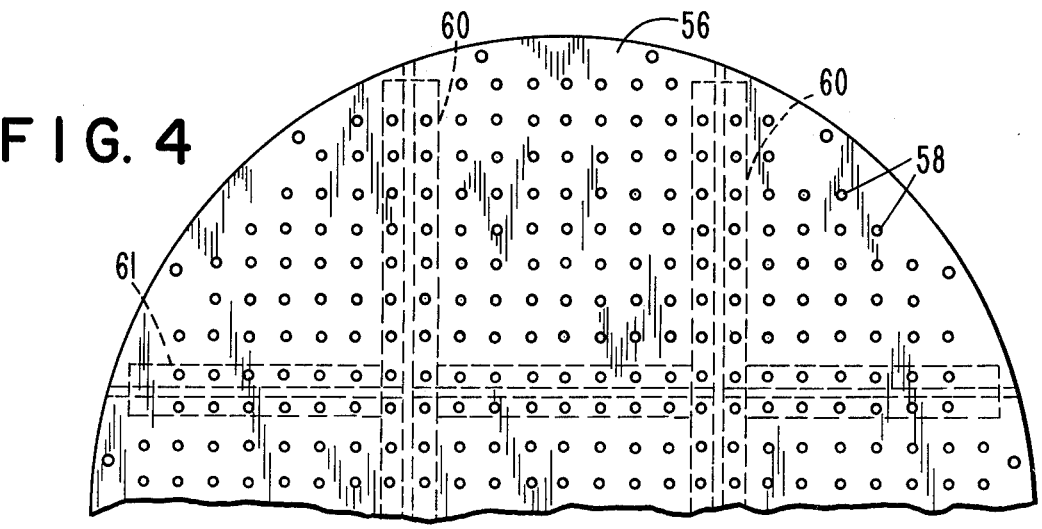
FIG. 4 is a partial top plan view of the distribution plate and the reinforcing ribs of the present invention removed from the rest of the pressure filter of the present invention.

The ability of the distribution plate 56 to support the weight of the filter plate 50 and the materials thereon without bowing or deformation of the filter plate 50 is further enhanced by welding to the bottom surface of the distribution plate 56 a plurality of reinforcing ribs 60 and 61. These ribs 60 and 61, as applied to the bottom surface of the distribution plate 56, are each in the form of an inverted T having a vertically extending flange 62 welded at its upper end to the bottom surface of the plate 56 and welded at its lower end to a flange 64 which is parallel to the plate 56 and perpendicular to the plane of the flange 62, as seen in FIGS. 1 and 3. Of course, the T-shaped reinforcing ribs 60 and 61 could be formed in one piece rather than by welding two separate flanges 62 and 64 together. As illustrated, in FIG. 4, the reinforcing ribs 60 applied to the bottom surface of the distribution plate 56 extend in one direction along a chord of the plate 56 while the reinforcing ribs 61 extend along a chord of the plate 56 in a direction at right angles with respect to the ribs 60 and thus the ribs 61 intersect with the ribs 60. The reinforcing ribs 60 are continuous over their entire length while the intersecting ribs 61 are necessarily made of a plurality of colinear sections which are suitably fitted between and on the sides of the ribs 60.

As can be seen in FIGS. 1 and 3, suitable mounting means indicated generally at 69 are provided for attaching the distribution plate 56 to the basket. As shown, the diameter of the distribution plate 56 is greater than that of the lower end of the basket so that the plate 56 extends outwardly along its entire circumference for a short distance beyond the lower end of the basket 6. A bottom support flange 70 is welded or otherwise secured to the outer surface of the lower end of the basket 6, the flange 70 encircling the basket and extending outwardly therefrom. Flange 70 is in an opposed mating relationship with that part of the distribution plate 56 which extends beyond the lower end of the basket 6. The flange 70 is reinforced by means of a cylindrical sleeve 72 which is positioned outside of the basket 6. The lower end of the cylindrical sleeve is welded to the top of the flange 70 while the upper end of the sleeve is welded to the outside surface of the basket 6 at a point adjacent to the top of the basket.

The distribution plate 56 is removably secured to the flange 70 by means of a plurality of threaded bolts 74 which pass upwardly through appropriate bores in the periphery of the distribution plate 56 where it extends beyond the basket 6 and mates with the flange 70, the flange 70 having corresponding threaded bores for receiving the bolts 74. This detachability feature of the distribution plate 56 is very convenient because, when the basket 6 is removed from the housing 4, the plate 56 may be detached, and the screen 54 removed thereby giving direct access to the filter plate 50 for cleaning or other purposes.

Means are provided for suspending the filter basket 6 inside the housing 4 in such a way that the atmosphere above the basket is sealed from the atmosphere below the basket, the suspending means being indicated generally at 76 in FIGS. 1 and 3. The suspending means 76 comprises a top support flange 78 which is welded at the top of the basket 6 to the outside surface of the basket, the flange 78 encircling the basket and extending outwardly therefrom. A cooperating shoulder 80 serves as a support for the flange 78 and thus for the basket 6, the shoulder 80 being welded to the inner surface of the central portion 10 of the casing 4 and extending inwardly therefrom to form a continuous support around the interior thereof. The shoulder 80 is spaced above the bottom of the casing 4 so that the basket 6 will be suspended at an appropriate height inside the casing 4.

The upper surface of the shoulder 80 carries a U-shaped groove 82 which extends along the entire length of the shoulder and which serves as a seat for a sealing means or gasket, in the form of an O-ring 84. When the basket 6 is lowered into housing 4 so that its flange 78 engages and is supported by the shoulder 80 to position the basket in the housing, the lower surface of flange 78 will engage and press downwardly on the O-ring 84, the weight of the basket flattening the O-ring 84 and making a hermetic seal. The basket 6 may be lowered by means of suitable handles 86 welded at opposite sides of the basket 6 to the upper surface of the flange 78 and which may be grasped to raise and lower the basket by hand. The handles extend upwardly from the flange 78 and preferably are U-shaped with the legs of the U being secured to the flange and extending upwardly and the cross-rib of the U serving as the handle portion adapted to be held in the hand.

The provision of the hermetic seal by means of the O-ring 84 is very important as it isolates the atmosphere above the basket 6 from the atmosphere below the basket 6. This allows positive air pressure to be utilized in the space above the basket to aid in the filtration process by assisting the gravity flow of the slurry through the filter plate 50 or, alternatively, vacuum could be used in the space below the basket in place of or in addition to the positive pressure above the basket to aid in the filtration process. The filter plate does not destroy the hermetic sealing of the space above the basket from the space below the basket because though the filter plate is porous to the slurry, it nonetheless is a sintered stainless steel plate which is not pervious to the passage of air. In addition, the slurry in the basket during a filtering operation effects a further seal to isolate the atmosphere above the basket from the atmosphere below. It is understood that any conventional means for conducting positive pressure or vacuum into the housing may be utilized, requiring merely air-tight couplings, such as those indicated at 88 and 89, for connection to the pressure or vacuum source respectively.

Another important feature of the present invention is that the basket 6 is suspended by the top support flange 78 and shoulder 80 in such a way that the O-ring 84 is situated externally of the basket 6 and is always kept above the slurry level in the basket 6. This arrangement ensures that the sterile slurry which is being filtered will never come into contact with the O-ring 84 and will thus not be contaminated by particles of the O-ring 84 which might arise from ring degradation or the like. The O-ring 84 is always kept above the slurry level by merely making sure that the basket 6 is long enough so that the slurry never overflows the top lip of the basket over the whole range of filtration rates which the pressure filter of the instant invention is designed to accommodate. Alternatively, the operator is able to see the slurry level in the top portion of the basket 6 through the sight ports and may adjust the slurry feed rate so as not to overfill the basket 6.

Additionally, the taper in the sides of the basket 6 allows it to be easily moved past the shoulder 80 when lifting it upwards to remove it from the housing 4. All the parts of the present invention including the basket, the flanges and the housing are sanitarily constructed with special attention provided to obtaining freedom from weld cracks or crevices. All welds are ground to a smooth radius and all internal components are finished with a polished surface. This type of sanitary construction enhances the ability of the pressure filter of the present invention to combat the possible contamination of the sterile slurry being filtered.

It will be obvious to one of ordinary skill in the art that various modifications may be made in the present invention as described without departing from the true spirit and scope of the invention and that therefore the scope of the invention is to be limited only by the appended claims.

I claim:
1. A filter assembly for use in filtering a slurry, said filter assembly comprising:
   a cylindrical housing, said housing including a removable cover, a downwardly extending wall, a base, and means for supplying unfiltered slurry to and for removing filtered slurry from said filter assembly;
   a filter basket supported within said housing, said filter basket including tapered imperforate side walls and a top support flange extending outwardly from an upper portion of said side walls, a support shoulder extending inwardly from said housing wall below said cover, and a resilient O-ring carried in a groove in said support shoulder, said top support flange engaging said support shoulder to support said filter basket within said housing with said O-ring providing a hermetic seal between said filter basket and said housing; and a filter plate assembly forming a bottom portion of said filter basket, said filter plate assembly including a perforated distribution plate provided with reinforcing ribs attached to the bottom surface of said distribution plate and exterior of said filter basket, a bottom support flange carried at a lower, exterior portion of said filter basket side walls, said distribution plate being secured to said bottom support flange, a support screen carried by said distribution plate within said side walls of said filter basket, and a filter plate of sintered material carried by said support screen within said side walls of said filter basket.

2. The filter of claim 1, wherein said filter plate is a sintered stainless steel material.

3. The filter of claim 1, wherein each said rib includes a vertically extending flange attached at its upper end to the bottom surface of said distribution plate and a horizontally extending flange attached to the lower end of said vertically extending flange.

* * * * *